United States Patent
Baik

(10) Patent No.: US 9,477,735 B2
(45) Date of Patent: Oct. 25, 2016

(54) CLOUD COMPUTING-BASED DATA SHARING SYSTEM AND METHOD

(71) Applicant: LSIS CO., LTD., Anyang-si, Gyeonggi-do (KR)

(72) Inventor: Joo Hyun Baik, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 260 days.

(21) Appl. No.: 13/970,444

(22) Filed: Aug. 19, 2013

(65) Prior Publication Data
US 2014/0059001 A1    Feb. 27, 2014

(30) Foreign Application Priority Data
Aug. 23, 2012   (KR) .......................... 10-2012-0092161

(51) Int. Cl.
*G06F 17/30*   (2006.01)
*G06Q 10/06*   (2012.01)

(52) U.S. Cl.
CPC ... *G06F 17/30575* (2013.01); *G06F 17/30174* (2013.01); *G06F 17/30578* (2013.01); *G06Q 10/06* (2013.01)

(58) Field of Classification Search
CPC .................. G06F 17/30575; G06F 17/30174; G06F 17/30578
USPC .............................. 707/608, 610, 612, 613
See application file for complete search history.

(56) References Cited

U.S. PATENT DOCUMENTS

| | | | |
|---|---|---|---|
| 2004/0128616 A1* | 7/2004 | Kraft ................. | G06F 17/30011 715/239 |
| 2004/0230903 A1* | 11/2004 | Elza ..................... | G06F 17/2241 715/234 |
| 2012/0041783 A1 | 2/2012 | McKee et al. | |
| 2015/0200832 A1* | 7/2015 | Kurniady ............ | H04L 43/0894 715/255 |

FOREIGN PATENT DOCUMENTS

| | | |
|---|---|---|
| CN | 1558574 | 12/2004 |
| CN | 101986652 | 3/2011 |

(Continued)

OTHER PUBLICATIONS

Japan Patent Office Application Serial No. 2013-170312, Office Action dated Sep. 1, 2014, 2 pages.

(Continued)

*Primary Examiner* — Vincent Boccio
(74) *Attorney, Agent, or Firm* — Lee, Hong, Degerman, Kang & Waimey PC; Jonathan Kang; Justin Lee

(57) ABSTRACT

Aspects of the present disclosure relate to cloud computing-based data sharing system and method, the system including a plurality of industrial device management units configured to transmit a recent shared data to a cloud server by periodically communicating with the cloud server, to receive a recent shared data of other industrial device management units received from the cloud server and to synchronize the shared data by updating the recent shared data to its own shared data, and a cloud server configured to compare a received shared data with a pre-stored shared data, in a case a shared data is received form an industrial device management unit among the plurality of industrial device management units through a communication network, to update its shared data as a result of the comparison, and to transmit a notification message including the updated shared data to other industrial device management unit through the communication network.

3 Claims, 4 Drawing Sheets

(56) References Cited

FOREIGN PATENT DOCUMENTS

| | | |
|---|---|---|
| JP | 2005-310158 | 11/2005 |
| JP | 2009-506423 | 2/2009 |
| JP | 2009-294764 | 12/2009 |
| JP | 2010-536096 | 11/2010 |
| WO | 0223405 | 3/2002 |
| WO | 2008/139521 | 11/2008 |
| WO | 2010/144733 | 12/2010 |

OTHER PUBLICATIONS

Bao, et al., "SyncViews: Toward Consistent User Views in Cloud-based File Synchronization Services," 2011 Sixth Annual ChinaGrid Conference, 2011 Sixth Annual, IEEE, XP-032063941, Aug. 2011, pp. 89-96.

European Patent Office Application Serial No. 13181197.8, Search Report dated Dec. 9, 2013, 7 pages.

"To Check the Synchronization Settings for iCloud and iPhone," http://dekiru.net/article/2302/, Dec. 2011 publication, 15 pages.

Japan Patent Office Application Serial No. 2013-170312, Office Action dated Jan. 23, 2015, 2 pages.

The State Intellectual Property Office of the People's Republic of China Application No. 201310372668.4, Office Action dated Mar. 14, 2016, 9 pages.

Bao, et al., "SyncViews: Toward Consistent User Views in Cloud-based File Synchronization Services," 2011 Sixth Annual ChinaGrid Conference IEEE, Aug. 2011, pp. 89-96.

Korean Intellectual Property Office Application Serial No. 10-2012-0092161, Office Action dated Dec. 9, 2015, 5 pages.

* cited by examiner

CLOUD COMPUTING-BASED DATA SHARING SYSTEM AND METHOD

CROSS-REFERENCE TO RELATED APPLICATION

Pursuant to 35 U.S.C. §119 (a), this application claims the benefit of earlier filing date and right of priority to Korean Application Number 10-2012-0092161, filed on Aug. 23, 2012, the contents of which are hereby incorporated by reference in their entirety.

BACKGROUND OF THE INVENTION

1. Field of the Invention

Aspects of the present disclosure relate to cloud computing-based data sharing system and method, and more particularly to cloud computing-based data sharing system and method configured to efficiently share operation information on various industrial devices including a PLC (Programmable Logic Controller) or an HMI (Human-Machine Interface) through a cloud computing environment.

2. Description of Related Art

Various industrial devices including a PLC (Programmable Logic Controller) or an HMI (Human-Machine Interface) are managed and operated by industrial device management units. The industrial device management units are generally formed using a personal computer, and are also installed with an operating software for enabling preparation of a driving program for the industrial device.

The driving program prepared by the operating software is downloaded by a relevant industrial device and executed. For example, if operating software configured to prepare a PLC driving program is installed at an industrial device management unit, the PLC driving program is prepared using the operating program and downloaded to a PLC.

Meanwhile, a system including same type or different type of several industrial devices may be required to share various data by operating software installed on each industrial device management unit. For example, in a case a PLC driving program records a value of certain state at a particular location in a memory, and an HMI device reads the value and displays the value on a screen, an operating program capable of preparing the HMI driving program is such that the PLC driving program must learn address of a memory storing a relevant state value.

That is, an operating software of an industrial device management unit for PLC operation and operating software of the industrial device management unit for HMI operation must share a memory address that stores a particular value. To this end, various methods are conventionally used including a method of sharing data in a file format, a method of separately installing software specially managing the shared data management, and a method of integrating all operating software.

However, the method of sharing data in a file format by two or more operating software among the abovementioned methods suffers from disadvantages in that access control to the shared data is impossible to make it difficult to guarantee consistency of shared data, and it is inconvenient to reflect amendment through files at one time.

Furthermore, the method of separately installing, at two or more software, the software specially managing the shared data management also suffers from disadvantages in that it is difficult to manage versions and to maintain interchangeability as participating operating software increases, and complexity increases that manages control operation to several software that individually operate increases.

The method of integrating all operating software into one also suffers from problems in that costs inevitably increase in light of various characteristics of participating devices, and problems occur of physically overlapped operating spaces when operating software is integrated into one computer device in light of managers being divided for each characteristic.

SUMMARY OF THE INVENTION

Exemplary aspects of the present disclosure are to substantially solve at least the above problems and/or disadvantages and to provide at least the advantages as mentioned below. Thus, the present disclosure is directed to provide cloud computing-based data sharing system and method configured to efficiently share operation information on various industrial devices including a PLC (Programmable Logic Controller) or an HMI (Human-Machine Interface) through a cloud computing environment.

In one general aspect of the present disclosure, there is provided a cloud computing-based data sharing system, comprising:
a plurality of industrial device management units configured to transmit a recent shared data to a cloud server by periodically communicating with the cloud server, to receive a recent shared data of other industrial device management units received from the cloud server and to synchronize the shared data by updating the recent shared data to its own shared data; and
a cloud server configured to compare a received shared data with a pre-stored shared data, in a case a shared data is received form an industrial device management unit among the plurality of industrial device management units through a communication network, to update its shared data as a result of the comparison, and to transmit a notification message including the updated shared data to other industrial device management unit through the communication network.

Preferably, but not necessarily, the cloud server may include a data base configured to divide, integrally store and/or maintain for each device, the data mutually shared by each industrial device management unit.

Preferably, but not necessarily, the industrial device management unit may include a storage storing its own shared data, an operating module configured to prepare a driving program of an industrial device, and store the data to be shared with other industrial device management units in the storage, and a data relay module configured to synchronize the shared data by transmitting the shared data stored in the storage to the cloud server by periodically communicating with the cloud server, and to update the shared data stored in the storage using the shared data included in the notification message, in a case the notification message included with the shared data of the other industrial device management units updated from the cloud server is received.

Preferably, but not necessarily, each of the industrial device management units may be installed with industrial device operating software configured to prepare a driving program of the industrial device, and the shared data includes metadata to be used by the industrial device operating software.

Preferably, but not necessarily, the metadata may include a storage location data of information accessible by a driving program of the industrial device.

In another general aspect of the present disclosure, there is provided a cloud computing-based industrial device management device communicating with a cloud server through a communication network, the industrial device management device comprising:

a storage storing its own shared data;

an operating module configured to prepare a driving program of an industrial device, and store the data to be shared with other industrial device management units in the storage; and a data relay module configured to synchronize the shared data by transmitting the shared data stored in the storage to the cloud server by periodically communicating with the cloud server, and to update the shared data stored in the storage using the shared data included in the notification message, in a case the notification message included with the shared data of the other industrial device management units updated from the cloud server is received.

Preferably, but not necessarily, each of the industrial device management units may be installed with industrial device operating software configured to prepare a driving program of the industrial device, and the shared data includes metadata to be used by the industrial device operating software.

Preferably, but not necessarily, the metadata may include a storage location data of information accessible by a driving program of the industrial device.

In still another general aspect of the present disclosure, there is provided a data sharing method of a cloud computing-based data sharing system including a plurality of industrial device management devices and a cloud server, the method comprising: periodically communicating, by an industrial device management unit among a plurality of industrial device management units, with the cloud server connected via a network, and transmitting its own recent shared data to the cloud server via the network; comparing, by the cloud server, the transmitted shared data with previously shared data stored in a database and updating the shared data stored in the database as a result of the comparison; transmitting, by the cloud server, a notification message including the updated shared data to other industrial device management units via the network after update of the shared data; and updating, by the industrial device management unit having received the notification message, its own shared data using the shared data included in the received notification message.

Preferably, but not necessarily, the shared data may include metadata to be used by industrial device operating software.

Preferably, but not necessarily, the metadata may include a storage location data of information accessible by a driving program of the industrial device.

The exemplary embodiment of the present disclosure is advantageously configured such that each industrial device management unit maintains shared data at up-to-date state by performing a periodic synchronization with a cloud server in a cloud computing-based environment.

Furthermore, the exemplary embodiment of the present disclosure is advantageously configured such that a cloud server notifies a change in shared data, in a case there is generated the change in shared data, whereby the shared data can be instantly updated. Particularly, industrial device operating software, configured to prepare a driving program of various industrial devices by being installed at an industrial device management unit, can be used for sharing metadata.

Still furthermore, the exemplary embodiment of the present disclosure is advantageously configured such that there is no problem of inconsistency in shared data because of no file trans-receiving method, there is no version or interchangeability management problem because of there being no need of installing a separate exclusive shared program, and there is no physical overlapping problem of operating spaces because of no integration of industrial device operating software. As a result, various data sharing for industrial automation can be efficiently and rapidly realized.

DETAILED DESCRIPTION

Hereinafter, exemplary embodiments of the present disclosure will be described in detail with reference to the accompanying drawings.

Figure 1:
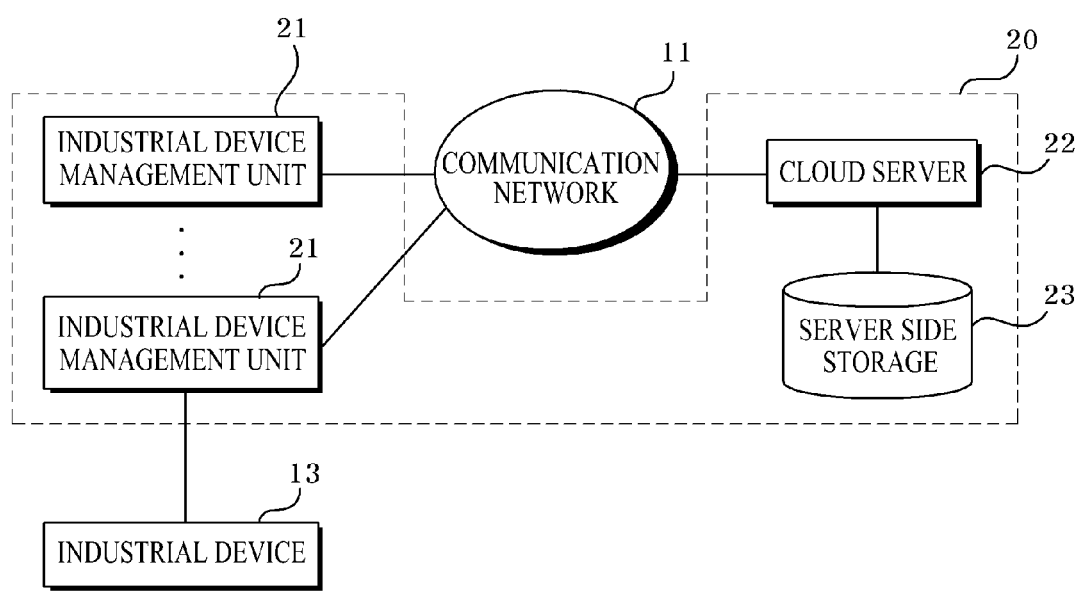
FIG. 1 is a schematic block diagram illustrating a network connection configuration of a cloud computing-based data sharing system according to the present disclosure.

FIG. 1 is a schematic block diagram illustrating a network connection configuration of a cloud computing-based data sharing system according to the present disclosure.

Referring to FIG. 1, a cloud computing-based data sharing system according to the present disclosure includes a plurality of industrial device management units (21), a cloud server (22) and server side storage (23).

The industrial device management unit (21) is an integrated device configured to communicate with the cloud server (22) via a communication network (11), and to share data with other industrial device management units. The industrial device management unit (21) may or may not be connected to one or more industrial devices (13) depending on its type. The industrial device (13) may include various types. For example, the industrial device (13) may be a PLC (Programmable Logic Controller) or an HMI (Human-Machine Interface) device. The industrial device management unit (21) is generally configured using a personal computer, but may be configured using a mobile terminal but may be configured in various types as long as performance is allowed. The industrial device management unit (21) is installed with industrial device operating software, where the industrial device operating software is a computer program configured to prepare a driving program for a particular industrial device. A driving program prepared by the industrial device operating software is executed by being downloaded to a relevant industrial device. The industrial device management unit (21) shares data with other industrial device management units and the shared data can generate an effect of virtually realizing integrated software.

The cloud server (22) communicates with each industrial device management unit by being connected thereto via the communication network (11). The cloud server (22) interacts with the server side storage (23) configured to store and maintain data mutually shared with each industrial device management unit (21), receives the shared data from the each industrial device management unit (21) to update the server side storage (22) to a recent shared data, or to transmit the recent shared data stored in the server side storage (23) in response to request from the each industrial device management unit (21).

Each industrial device management unit (21) basically functions to synchronize the shared data by periodically communicating with the cloud server (22), where the synchronization of shared data means to maintain same data structure and format relative to mutually different two or more data storage spaces. The types or contents of data that are subjected to synchronization may be variably configured based on needs including operation information, state information, environment information and set information.

Particularly, the shared data may include metadata to be used by the each industrial device operating software, where the metadata may include storage location or usage of information to be accessed by a driving program of each industrial device. By way of more specific example, in a case the PLC records, at a particular address of a memory, a state value of a predetermined sensor, "0" or "1", and the HMI device reads the value and displays the value on a screen, an industrial device management unit for operating the PLC and an industrial device management unit for operating the HMI device may share a memory address (metadata) configured to store a state value of a relevant sensor.

The industrial device management units (21) sharing the data through the cloud server (22) may be divided by groups. At this time, the industrial device operating software may function to register itself on a group configured to share the data together. Particularly, the cloud server (22) transmits, to another industrial device management unit, a notification message notifying that the shared data maintained by itself and the shared data maintained by a predetermined industrial device management unit are different, in a case the shared data maintained by itself and the shared data maintained by a predetermined industrial device management unit are different.

The notification message may be variably configured if necessary, and for example, the notification message may include a subject (whose data it is) performing the notification and a changed matter of shared data (what or which data was changed).

In a case a notification message is received from the cloud server (22), each industrial device management unit (21) compares the shared data included in the received notification message with its owned shared data to update using a recent shared data, if there is a data that requires update. As a result, each industrial device management unit (21) can update the shared data based on the notification, in addition to the periodic synchronization, whereby data can be more swiftly and accurately shared. Now, a process of data sharing being realized will be explained according to the present disclosure with reference to FIG. 2.

Figure 2:
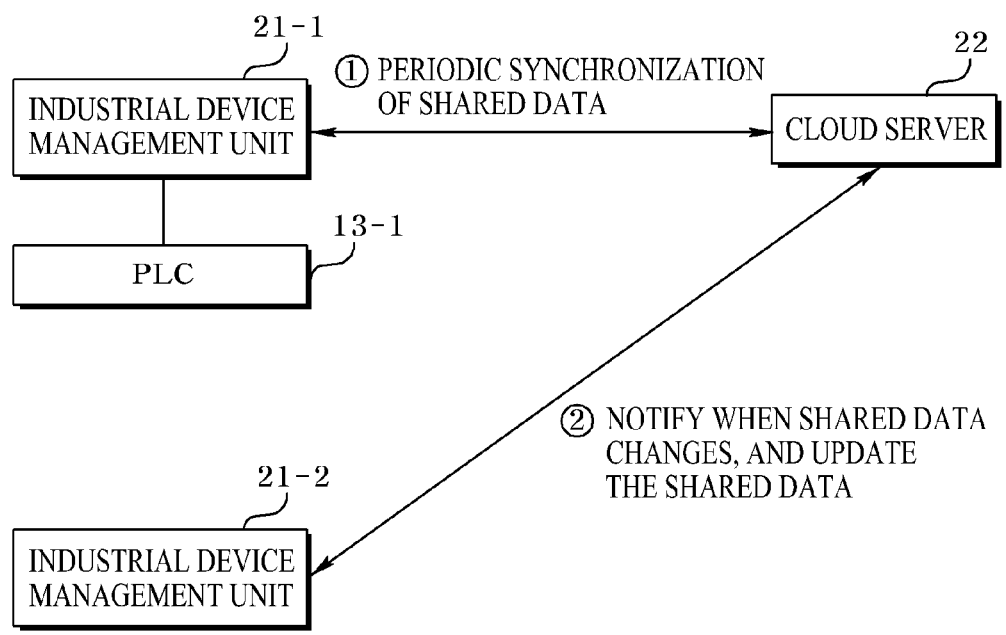
FIG. 2 is a schematic block diagram illustrating a data synchronization process between a cloud server and an industrial device management unit in a cloud computing-based data sharing system according to the present disclosure.

FIG. 2 is a schematic block diagram illustrating a data synchronization process between a cloud server and an industrial device management unit in a cloud computing-based data sharing system according to the present disclosure.

Referring to FIG. 2, first, an industrial device management unit (21-1) operating a PLC (13-1) periodically synchronizes its own shared data with the cloud server (22). The cloud server (22) in this process performs to notify the determination to another industrial device management unit (21-2) operating the HMI device, if it is determined that update of shard data is necessary because the shared data maintained by the cloud server (22) and the shared data of the industrial device management unit (21-1) that operates the PLC are different. Then, the industrial device management unit (21-2) that operates the HMI device updates its own shared data using the recent shared data.

Figure 3:
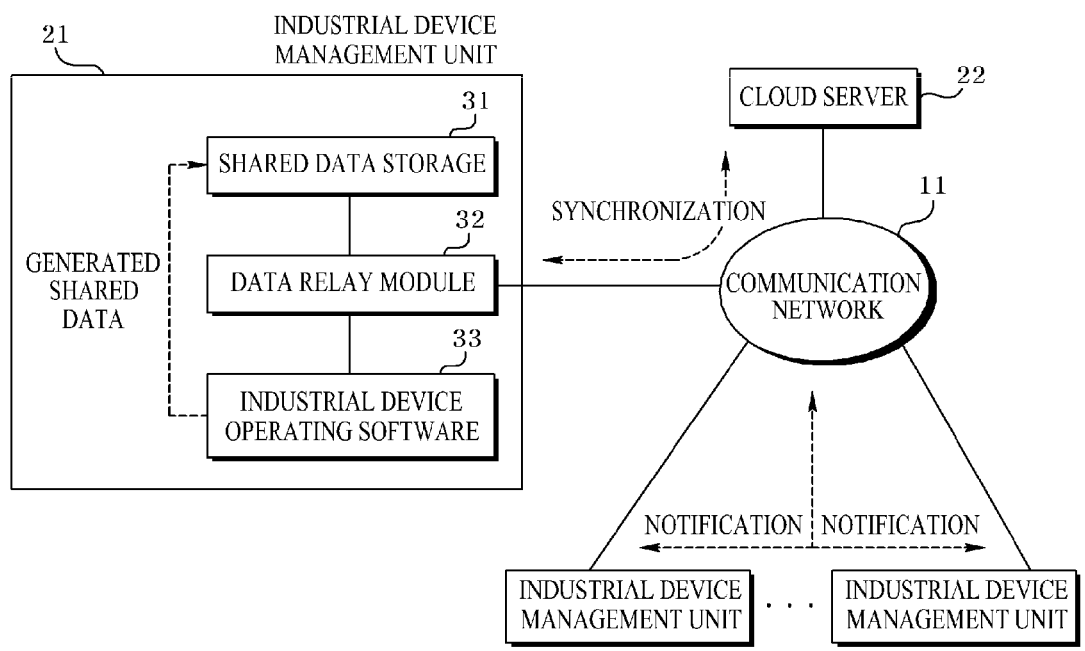
FIG. 3 is a schematic block diagram illustrating a detailed network connection configuration of a cloud computing-based data sharing system according to the present disclosure.

FIG. 3 is a schematic block diagram illustrating a detailed network connection configuration of a cloud computing-based data sharing system according to the present disclosure.

Referring to FIG. 3, the industrial device management unit (21) includes a shared data storage (31), a data relay module (32) and industrial device operating software (33).

The shared data storage (31) is a component to allow the industrial device operating software (33) to store its own shared data, and may have volatile or non-volatile properties. The industrial device operating software (33) is a computer program to allow preparing a driving program of a particular industrial device, where the prepared driving program is executed by being downloaded to a relevant industrial device.

Particularly, the industrial device operating software (33) allows a relevant shared data in the shared data storage (31), in a case data to be shared with the other industrial device operating software is generated during the execution.

The data relay module (32) basically functions to synchronize the shared data of the shared data storage (31) by periodically communicating with the cloud server (22). The data relay module (32) may be configured with some of modules of the industrial device operating software (33), or may be configured with a separate computer program.

In the synchronization process of the shared data, the cloud server (22) updates a changed data using a server side storage (23), in a case the shared data of its own maintenance is different from the shared data of the industrial device management unit (21), and transmits the updated shared data to another industrial device management unit via a notification message. In this connection, the data relay module (32) extracts the changed recent data included in the notification message received from the cloud server (22), in a case the notification message is received from the cloud server (22), and updates the shared data of the shared data storage (31) using the extracted data. Now, operation of the data relay module (32) will be described in detail with reference to FIG. 4.

Figure 4:
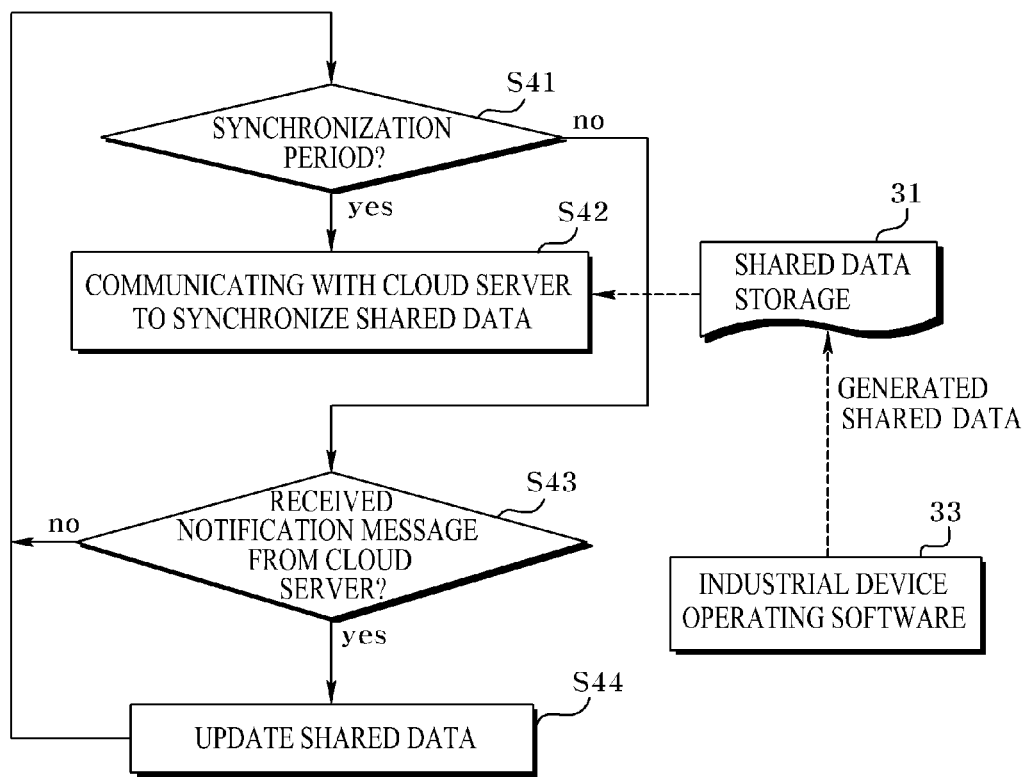
FIG. 4 is a flowchart illustrating a detailed operating process of a data relay module of FIG. 3.

FIG. 4 is a flowchart illustrating a detailed operating process of a data relay module of FIG. 3.

First, as mentioned above, the industrial device operating software (33) stores a relevant shared data in the shared data storage (31), in a case a shared data with another industrial device management unit is generated.

At this time, the industrial device operating software (33) may perform a process for data identification including attachment of intrinsic ID (Identification) on the relevant data and/or attachment of identification information of a relevant industrial device management unit.

The data relay module (32) periodically communicates with the cloud server (22) to synchronize the shared data stored in the shared data storage (31) (S41, S42). That is, in a case its own shared data is a recent data, the data relay module (32) uploads its own recent shared data to the cloud server (22), and receives a relevant shared data to update its own shared data, in a case the shared data maintained by the cloud server (22) is a recent data.

Furthermore, the data relay module (32) updates the shared data of the shared data storage (31) (S44), in a case a notification message is received from the cloud server (22) (S43).

The industrial device operating software (33) accesses the shared data storage (31) to check a recent history of the shared data, and operates in response thereto. That is, each industrial device management unit can instantly update to a changed recent shared data through the notification message from the cloud server (23), and the industrial device operating software (33) can instantly use the relevant data. As a result, a cooperative work using the shared data of the each industrial device operating software (33) can be efficiently realized.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A cloud computing-based data sharing system, comprising:
    a plurality of hardware industrial device management units connected to one or more hardware Programmable Logic Controllers (PLC), wherein the plurality of industrial device management units are configured to share data including metadata to be used by the one or more PLCs; and
    a cloud server configured to:
        receive a first subset of the data from one of the plurality of industrial device management units,
        wherein the data comprises a plurality of types of data variably configurable to be synchronized,
        wherein the first subset of the data corresponds to a first type of data configured to be synchronized and the data comprises a second subset of data corresponding to a second type of data configured not to be synchronized, and
        wherein the second type of data is configurable to be synchronized;
        compare the first subset of the data with second data that is pre-stored at the cloud server; and
        transmit a notification message to at least another of the plurality of industrial device management units indicating that updating the second data is needed, wherein the notification message includes the first subset of the data;
    wherein the at least another industrial device management unit is configured to update a local second data to the first subset of the data in response to receiving the notification message; and
    wherein the local second data comprising metadata includes a memory location corresponding to information accessible by an operating program of each corresponding one the one or more PLCs, and the information comprises a state value of a sensor generated by one of the one or more PLCs.

2. The system of claim 1, wherein the cloud server includes a data base configured to store the first or second data that is divided or combined for each of the industrial device management units.

3. A data sharing method of a cloud computing-based data sharing system including a plurality of hardware industrial device management devices connected to one or more hardware Programmable Logic Controllers (PLC) and a cloud server wherein the plurality of industrial device management units are configured to share data including metadata to be used by the one or more PLCs, the method comprising:
    receiving, by the cloud server, a first subset of the data from one of the plurality of industrial device management units, the first subset of the data including metadata to be used by the one or more PLCs,
    wherein the data comprises a plurality of types of data variably configurable to be synchronized,
    wherein the first subset of the data corresponds to a first type of data configured to be synchronized and the data comprises a second subset of data corresponding to a second type of data configured not to be synchronized, and
    wherein the second type of data is configurable to be synchronized;
    comparing, by the cloud server, the first subset of the data with second data that is pre-stored at the cloud server;
    transmitting, by the cloud server, a notification message to at least another of the plurality of industrial device management units indicating that updating the second data is needed, wherein the notification message includes the first subset of the data; and
    updating, by the at least another of the plurality of industrial device management units, a local second data to the first subset of the data in response to receiving the notification message;
    wherein the local second data comprising metadata includes a memory address corresponding to information accessible by an operating program of each corresponding one the one or more PLCs, and the information comprises a state value of a sensor generated by one of the one or more PLCs.

* * * * *